United States Patent
Zhao et al.

(10) Patent No.: US 9,367,520 B2
(45) Date of Patent: Jun. 14, 2016

(54) SCORECARD MODELS WITH MEASURED VARIABLE INTERACTIONS

(71) Applicant: FAIR ISAAC CORPORATION, Roseville, MN (US)

(72) Inventors: Xing Zhao, San Diego, CA (US); Peter Hamilton, Novato, CA (US); Andrew K. Story, Petaluma, CA (US); Andrew Flint, El Cerrito, CA (US)

(73) Assignee: FAIR ISAAC CORPORATION, Roseville, MN (US)

( * ) Notice: Subject to any disclaimer, the term of this patent is extended or adjusted under 35 U.S.C. 154(b) by 661 days.

(21) Appl. No.: 13/722,826

(22) Filed: Dec. 20, 2012

(65) Prior Publication Data
US 2014/0180649 A1   Jun. 26, 2014

(51) Int. Cl.
*G06F 7/60* (2006.01)
*G06F 17/18* (2006.01)

(52) U.S. Cl.
CPC ...................................... *G06F 17/18* (2013.01)

(58) Field of Classification Search
CPC ...................................................... G06F 17/10
See application file for complete search history.

(56) References Cited

U.S. PATENT DOCUMENTS

| | | | | |
|---|---|---|---|---|
| 7,881,994 B1* | 2/2011 | An et al. | ............................ | 705/35 |
| 2002/0127529 A1* | 9/2002 | Cassuto | ................... | G09B 5/02 434/335 |
| 2006/0212386 A1* | 9/2006 | Willey et al. | ..................... | 705/38 |
| 2007/0106550 A1* | 5/2007 | Umblijs et al. | .................. | 705/10 |
| 2009/0037323 A1* | 2/2009 | Feinstein et al. | ................. | 705/38 |
| 2009/0055139 A1* | 2/2009 | Agarwal et al. | ..................... | 703/2 |
| 2010/0057509 A1* | 3/2010 | Kumar et al. | ...................... | 705/7 |
| 2010/0268639 A1* | 10/2010 | Feinstein et al. | ................. | 705/38 |
| 2011/0035379 A1* | 2/2011 | Chen et al. | ..................... | 707/740 |
| 2011/0137847 A1* | 6/2011 | Fahner | ............................. | 706/52 |
| 2011/0166988 A1* | 7/2011 | Coulter | ............................ | 705/38 |
| 2011/0213628 A1* | 9/2011 | Peak et al. | .......................... | 705/4 |
| 2013/0218758 A1* | 8/2013 | Koenigsbrueck et al. | ....... | 705/39 |
| 2013/0339202 A1* | 12/2013 | Zhao et al. | ....................... | 705/34 |

OTHER PUBLICATIONS

Kasza et al.("A comparison of score-based methods for estimating Bayesian networks using the Kullback-Leibler divergence",University of Adelaide, 2011, pp. 1-18).*
Caire et al. ("A Handbook for Developing Credit Scoring Systems in a Microfinance Context",USAID 2006, pp. 1-67).*
Lyn C. Thomas ("A survey of credit and behavioural scoring: forecasting financial risk of lending to consumers", International Journal of Forecasting, 2000, pp. 149-172).*

(Continued)

*Primary Examiner* — Omar Fernandez Rivas
*Assistant Examiner* — Iftekhar Khan
(74) *Attorney, Agent, or Firm* — Mintz Levin Cohn Ferris Glovsky and Popeo, P.C.

(57) ABSTRACT

Data is received that characterizes a transaction and includes a plurality of values corresponding to variables. Thereafter, a score is determined for the transaction based on the received data and using a scoring model. The scoring model only uses variables pairs having a divergence residual above a pre-defined threshold. Thereafter, data is provided that characterizes the determined score. Related apparatus, systems, techniques and computer program products are also described.

20 Claims, 3 Drawing Sheets

(56) References Cited

OTHER PUBLICATIONS

A Neri ("The planning of marketing strategies in consumer credit: an approach based on graphical chain models for ordinal variable", Journal of the Operational Research Society (2001) 52, 1034-1044 ).*

A Neri ("The planning of marketing strategies in consumer credit: an approach based on graphical chain models for ordinal variables", Journal of the Operational Research Society (2001) 52, 1034-1044 ).*

* cited by examiner

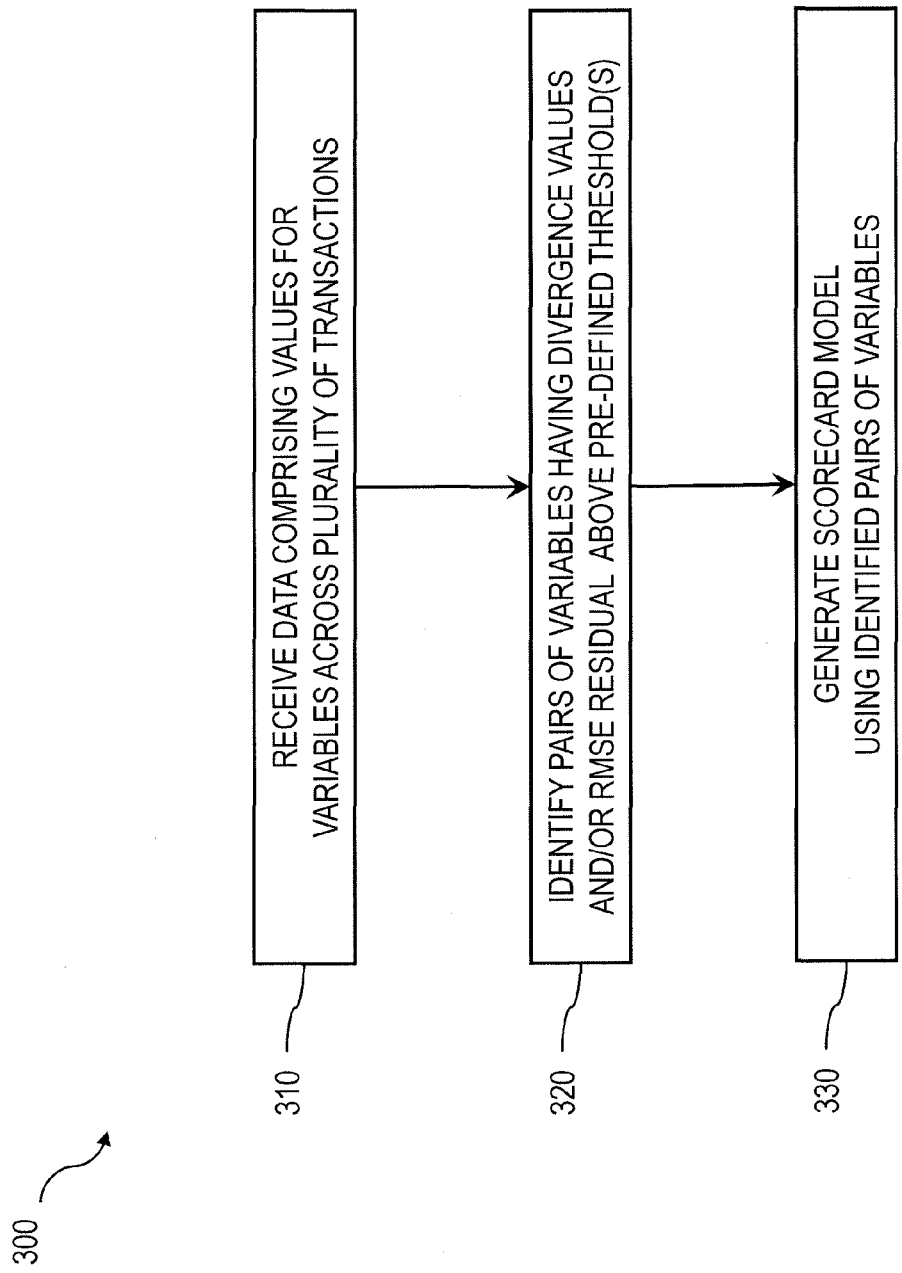

SCORECARD MODELS WITH MEASURED VARIABLE INTERACTIONS

TECHNICAL FIELD

The subject matter described herein relates to scorecard models that are generated by measuring variable interactions.

BACKGROUND

Scorecard models are effective tools for providing scores that characterize a particular data set for predictive purposes (e.g., to determine a likelihood of a future event taking place). The most common prediction tasks for scorecards are to estimate a function $f$ from predictors to a target domain. In contrast to scorecard models, a linear regression model is a linear combination of predictors:

$$f = w_0 + \sum_{i=1}^{I} w_i x_i,$$

where $x_i$ is the value of the ith predictor, and $w_i$ the regression weight to be trained.

Compared with regression models, scorecard models can have a binning step to divide each predictor space into bins that are then assigned weights.

$$f = w_0 + \sum_{i=1}^{I} f_i(x_i),$$

where $f_i(x_i)$ is the predictor score:

$$f_i(x_i) = \sum_{j=1}^{J_i} w_{ij} b_{ij}(x_i)$$

$$b_{ij}(x_i) = \begin{cases} 1 & \text{if value of } x_i \text{ belongs to the } j\text{th bin} \\ 0 & \text{else} \end{cases}$$

$w_{ij}$: the score weights associated with bin j for predictor $x_i$.

$b_{ij}$: the indicator of variables for the bins of predictor $x_i$.

Bins for all predictors can be generated using various binning algorithms which can also support categorical predictors. Missing values can be handled by using a missing value bin. Given enough bins for a predictor $x_i$, the above predictor score function $f_i(x_i)$ is flexible to approximate any general function based on a single predictor, and the scorecard model is the sum of such functions. The complete, compact representation of a model by its bin definitions and weights makes the scorecard a popular, transparent, and easily understood model formulation. And the ability of a scorecard to approximate general functions makes it a strong predictive tool.

Scorecards can be trained to optimize the bin weights such that the prediction errors of the model are minimized. Scorecards can be used to predict both continuous and binary targets. For continuous targets, the error function is usually a root mean square error (RMSE) function. For binary targets, common objective functions include maximizing Kullback-Leibler divergence or Bernoulli likelihood can be used.

Scorecards are much more powerful than regression models, and still simple enough to be interpretable. By looking into the bin weights for the predictors, insight can be gained for the data.

SUMMARY

Ion one aspect, data is received that characterizes a transaction and includes a plurality of values corresponding to variables. Thereafter, a score is determined for the transaction based on the received data and using a scoring model. The scoring model only uses variables pairs having a divergence residual above a pre-defined threshold. Thereafter, data is provided that characterizes the determined score.

Providing data as used herein can include one or more of: displaying the score, transmitting data characterizing the determined score, loading data characterizing the determined score, and storing data characterizing the determined score.

The scoring model can be a scorecard model. In some cases, it is a 2-D scorecard model while in other cases is an N dimensional scorecard model in which N is greater than 2.

The scorecard model can be developed by capturing interactions among cross binnings between a given predictor pair $(x_{i1}, x_{i2})$. One manner to capture interactions among cross binnings can comprise:

$$f_{i1,i2}(x_{i1}, x_{i2}) = \sum_{j=1}^{J_{i1i2}} w_{i1i2,j} b_{i1i2,j}(x_{i1}, x_{i2})$$

Where:

$$b_{i1i2,j}(x_{i1}, x_{i2}) = \begin{cases} 1 & \text{if values of } x_{i1} \text{ and } x_{i2} \text{ belong to } j\text{th cross bin} \\ 0 & \text{else} \end{cases},$$

$w_{i1i2j}$ is a weight for cross bin j for predictor pair $(x_{i1}, x_{i2})$, $b_{i1i2j}$ is an indicator variable for each cross bin of predictor pairs $(x_{i1}, x_{i2})$.

Divergence residual, $DivR(x_{i1}, x_{i2})$, can be equal to $Div(x_{i1} \times x_{i2}) - Div(x_{i1} + x_{i2})$, such that $Div(x_{i1} \times x_{i2})$ is divergence of an N-D scorecard model, and $Div(x_{i1} + x_{i2})$ is divergence of an N-variable scorecard.

The scoring model $f$ can include:

$$f = w_0 + \sum_{i=1}^{I} f_i(x_i) + \sum_{(i1,i2)} f_{i1,i2}(x_{i1}, x_{i2})$$

where $f_i(x_i)$ is a predictor score:

$$f_i(x_i) = \sum_{j=1}^{J_i} w_{ij} b_{ij}(x_i)$$

$$b_{ij}(x_i) = \begin{cases} 1 & \text{if value of } x_i \text{ belongs to the } j\text{th bin} \\ 0 & \text{else} \end{cases}$$

$w_{ij}$: are score weights associated with bin j for predictor $x_i$,
$b_{ij}$: is an indicator of variables for the bins of predictor $x_i$.

In an interrelated aspect, data is received that characterizes a transaction and includes a plurality of values corresponding to variables. Thereafter, a score for the transaction is determined based on the received data and using a scoring model. The scoring model can, in some variations, only use variables pairs having a root mean square error (RMSE) residual above a pre-defined threshold. Data is later provided that characterizes the determined score.

In a further interrelated aspect, data is received that comprises a plurality of values for variables across a plurality of transactions. Pairs of variables having divergence values above a pre-defined threshold are then identified. A scorecard model is then generated using the identified pairs of variables. The scorecard model in this variation can be a segmented scorecard model and the identified pairs of variables can be used as splitter variables.

In still a further interrelated aspect, data is received that includes a plurality of values for variables across a plurality of transactions. Pairs of variables having RMSE residual values above a pre-defined threshold are identified so that a scorecard model can be generated using the identified pairs of variables.

The current subject matter identifies variable pairs having strong interactions by training a two dimension scorecard which captures pair wise interaction between variables. Thereafter, a one dimension scorecard is trained which does not have interaction among variables. The performance difference from these two models is because of interaction, thus a measure can be obtained for interaction.

Computer program products are also described that comprise non-transitory computer readable media storing instructions, which when executed one or more data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein provides many advantages. For example, the current subject matter is advantageous in that by measuring variable interactions as part of a scorecard model, enhanced predictive capacity is provided. In addition, the current techniques can be used to identify better/optimized splitters for segmented scorecard techniques.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 3 is a process flow diagram illustrating generation of a scorecard model using pairs of variables having measured interaction levels.

DETAILED DESCRIPTION

Figure 1:
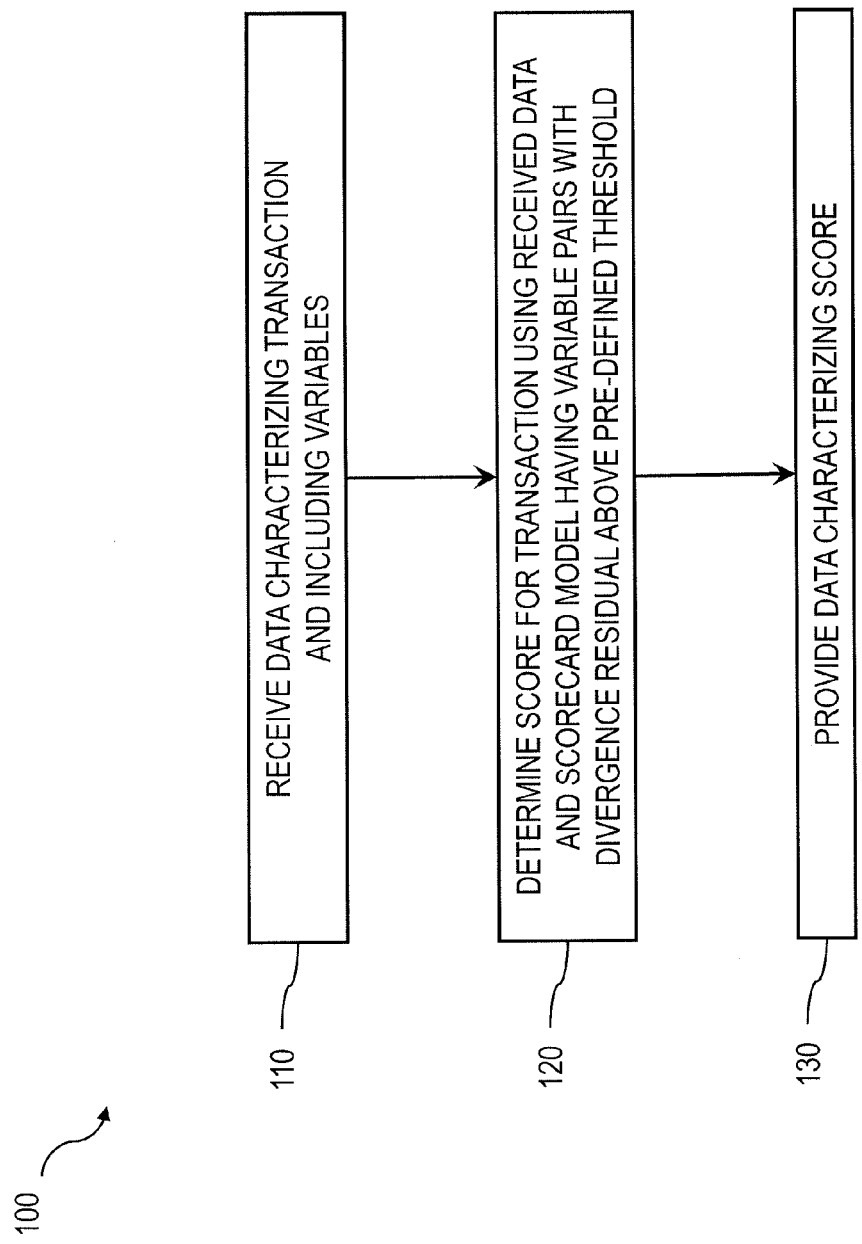
FIG. 1 is a process flow diagram illustrating scoring of a transaction using a scorecard model with pairs of variables having divergence residual values above a pre-defined threshold.

Conventional scorecard models can be characterized as additive models that assume there is no interaction among predictors (i.e., the variables). In practice however, there can be interactions among predictors. The current subject matter is directed to models that identify and exploit such interactions among predictors.

Interaction among predictors can, in some implementations, be determined using segmented scorecard techniques (sometimes simply referred to as "segmented scorecard" which is similar to a decision tree) such as those described and illustrated in U.S. Pat. No. 8,255,423 entitled "Adaptive random trees integer non-linear programming", the contents of which are hereby incorporated by references. When using a traditional decision tree as a predictive model, the leaf node typically returns a dominant outcome (classification) or mean value (regression). With a segmented scorecard, the leaf node can be associated with a scorecard model. By placing individual scorecards in the leaf nodes of a decision tree, the whole ensemble model can capitalize on interactions among the predictors.

Another approach to capturing interactions can be to use cross binnings between a given predictor pair $(x_{i1}, x_{i2})$.

$$f_{i1,i2}(x_{i1}, x_{i2}) = \sum_{j=1}^{J_{i1i2}} w_{i1i2,j} b_{i1i2,j}(x_{i1}, x_{i2}) \quad (1.0)$$

$$b_{i1i2,j}(x_{i1}, x_{i2}) = \begin{cases} 1 & \text{if values of } x_{i1} \text{ and } x_{i2} \text{ belong to the } j\text{th cross bin} \\ 0 & \text{else} \end{cases}$$

$w_{i1i2j}$: weight for cross bin j for predictor pair $(x_{i1}, x_{i2})$
$b_{i1i2j}$: indicator variables for cross bins of predictor pair $(x_{i1}, x_{i2})$ Here each predictor pair can be divided into many cross bins. For example, if $x_{i1}$ has M bins and $x_{i2}$ has N bins, then there are M×N cross bins for the $(x_{i1}, x_{i2})$ pair. Such a scorecard model is referred to herein as a 2-D scorecard.

When there are many predictors, it is not practical to simply include all possible pairs in a scorecard model. Thus, finding the predictor pairs with strong interactions is important. The current subject matter is directed, in part, to detecting pairwise interactions efficiently. This detection can be accomplished by iterating through all predictor pairs and training a 2-D scorecard model using only the predictor pairs as described above in Equation 1.0. This model can then compared to scorecard model with two additive (non-crossed) predictors described in Equation 1.1:

$$f_{i1}(x_{i1}) + f_{i2}(x_{i2}) = \sum_{j=1}^{J_{i1}} w_{i1j} b_{i1j}(x_{i1}) + \sum_{j=1}^{J_{i2}} w_{i2j} b_{i2j}(x_{i2}) \quad (1.1)$$

If the variable pair has strong interaction, the model in Equation 1.0 will have notably stronger performance than the model in Equation 1.1. These differences in model performance can be used to measure the degree of any pairwise interaction.

In summary, the current subject matter can be characterized as using "divergence residual" which is the divergence difference of a 2-D scorecard and a two variable scorecard (or in some cases a N-D scorecard and an N variable scorecard).

Divergence Residual: $DivR(x_{i1}, x_{i2}) = Div(x_{i1} \times x_{i2}) - Div(x_{i1} + x_{i2})$.

Here $\text{Div}(x_{i1} \times x_{i2})$ is the divergence of 2-D scorecard model, and $\text{Div}(x_{i1} + x_{i2})$ is the divergence of a two variable scorecard.

The divergence residual has the following properties:
$\text{Div}(A \times B)$ is always greater or equal to $\text{Div}(A+B)$.
$\text{DivR}(A, B)=0$ when there is no interaction. In practice, even when there is no interaction, it is possible that DivR (A, B)>0 on the training data set because of over fitting. This problem can be fixed by using the testing data set for divergence evaluation.
The more interaction between the variable pair, the bigger the divergence residual.

Once predictor pairs with strong interactions are found, such pairs can be included in the scorecard model with other predictors:

$$f = w_0 + \sum_{i=1}^{I} f_i(x_i) + \sum_{(i1,i2)} f_{i1,i2}(x_{i1}, x_{i2}) \qquad (2.2)$$

The above scorecard model captures important pairwise interactions among predictors.

The divergence residual can also be used to find good variable splitters for a segmented scorecard. Segmented scorecard search can be characterized as a greedy based enumeration algorithm that simulates possible combinations of splitter candidates to find a good segmented scorecard. With segmented scorecards, it can be important for the search algorithm to start with a limited set of good splitter candidates in order to finish the enumeration within reasonable time. How to decide the splitter candidates has always been a challenging problem. The current subject matter is directed, in part, to using divergence residual to select candidate split variables.

As explained above, one can calculate the divergence residual for each variable pair. Then, single variable based divergence residual can be introduced: $\text{DivR}(A)=\text{sum}(\text{DivR}(A, *))$. Divergence residual measures the interaction of a given variable with all other variables. It is known that good segmented scorecard splitters are usually variables with lots of interaction with other variables. This variable based divergence residual can be used as the measure to select splitters, bigger DivR=>more interaction=>better splitter.

RMSE Residual. The divergence is one of the performance measures for models with binary targets. Root mean square error (RMSE) is a performance measure of models with continuous targets. Scorecards can be trained for either binary target or continuous targets. Similar to divergence residual, one can use RMSE residual to measure variable interactions for problems with continuous targets.

RMSE Residual: $\text{RMSE\_R}(x_{i1},x_{i2})=\text{RMSE}(x_{i1} \times x_{i2})-\text{RMSE}(x_{i1}+x_{i2})$ Here RMSE $(x_{i1} \times x_{i2})$ is the RMSE of 2-D scorecard model and RMSE$(x_{i1}+x_{i2})$ is the RMSE of a two variable scorecard. In this case, the targets are continuous variables.

Computation Complexity.

Given N variables, one has $N*(N-1)/2$ variable pairs. For each pair, the training of Equations 1.0 and 1.1 are needed. As Equations 1.1 and 1.0 are simple problems with only two predictors, they can be solved very fast. In addition, with only two variables involved, a relatively smaller number of records are needed to get a reliable estimate of the divergence residual.

In one example, given a problem with 18 variables, 5000 records, 10 bins for each variable, the inventors were able to calculate the divergence residual for all the pairs within 0.5 seconds. The inventors are also identified that a 1000 variable problem takes less than 15 minutes to calculate. Thus the above techniques are feasible for practical size problems.

N Way Variable Interactions.

The above method is designed to detect pairwise variable interactions. In practice, a model is usually powerful enough if all pairwise interactions are captured. In theory, the same idea can be extended to deal with three way interactions or N way interactions. For 3 way interactions, it can be measured as the performance difference between a 3D scorecard and a 2-D scorecard as the following:

$$\text{DivR}(x_{i1},x_{i2},x_{i3})=\text{Div}(x_{i1} \times x_{i2} \times x_{i3})-\text{Div}(x_{i1} \times x_{i2}+x_{i1} \times x_{i3}+x_{i1} \times x_{i3})$$

Here $\text{Div}(x_{i1} \times x_{i2} \times x_{i3})$ is the divergence of 3D scorecard model, and $\text{Div}(x_{i1} \times x_{i2}+x_{i1} \times x_{i3}+x_{i1} \times x_{i3})$ is the divergence of 2-D scorecard with three variable pairs.

It is computationally expensive to calculate the three way interactions. First, there are more three way combinations. It will total $N*(N-1)*(N-2)/6$ combinations given N variables. Second, it needs more data to build a robust 3D scorecard. Assuming 10 bins for each variable, a corresponding 3D scorecard has 1000 bins. The data needs to have several 100K records at least so that there are enough records in each 3D scorecard bin.

Figure 2:
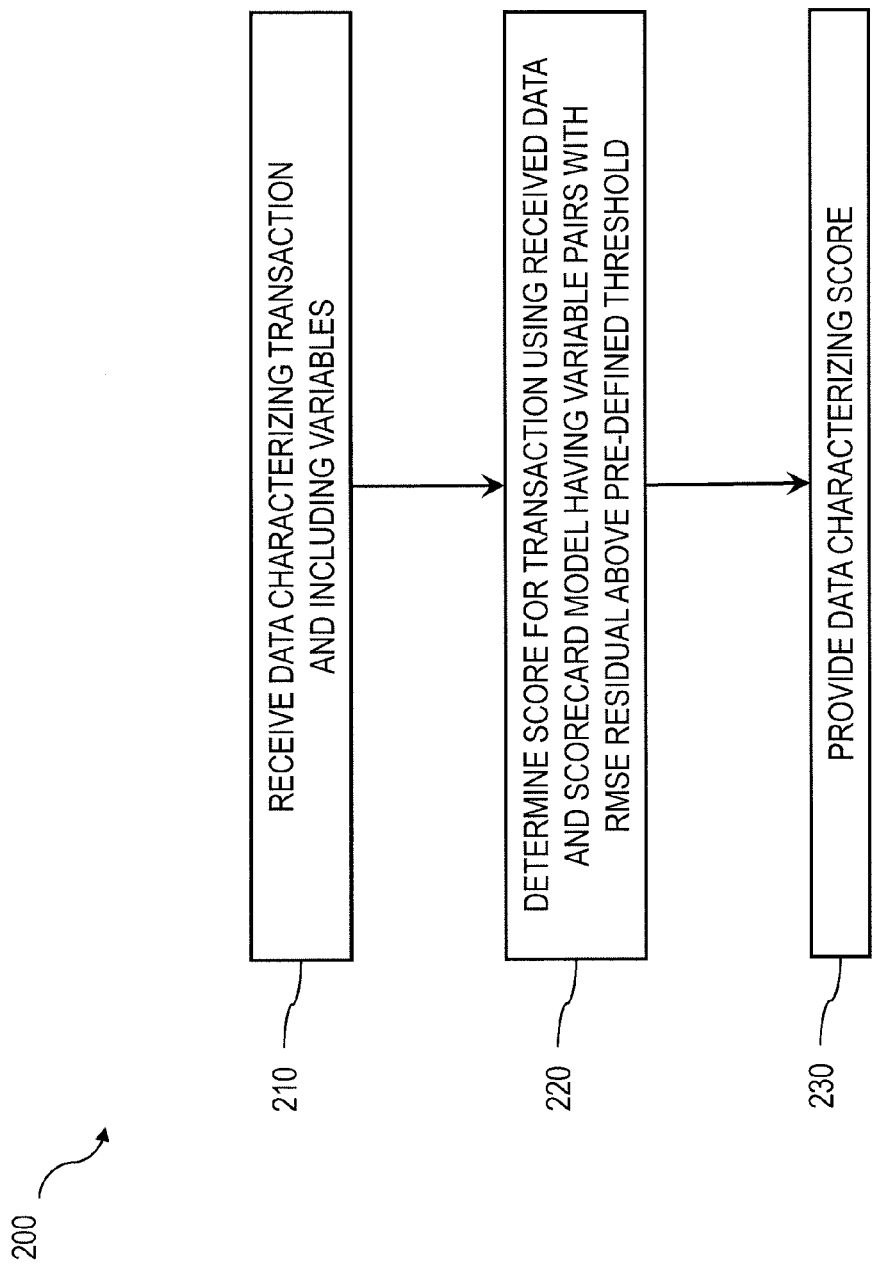
FIG. 2 is a process flow diagram illustrating scoring of a transaction using a scorecard model with pairs of variables having RMSE residual values above a pre-defined threshold.

FIGS. 1-3 are diagrams 100, 200, 300 illustrating various methods for implementing the current subject matter. The diagram 100 of FIG. 1 illustrates a run-time method in which, at 110, data is received that characterizes a transaction and which includes a plurality of values corresponding to variables. Thereafter, at 120, a score is determined for the transaction based on the received data and using a scoring model. This scoring model only uses variables pairs having a divergence residual above a pre-defined threshold. Subsequently, at 130, data is provided (e.g., displayed, transmitted, stored, loaded, etc.) that characterizes the determined score.

The diagram 200 of FIG. 2 illustrates a run0time method in which, at 210, data is received that characterizes a transaction and which includes a plurality of values corresponding to variables. Thereafter, at 220, a score is determined for the transaction based on the received data and using a scoring model. This scoring model only uses variables pairs having a root mean square error (RMSE) residual above a pre-defined threshold. Subsequently, at 230, data is provided (e.g., displayed, transmitted, stored, loaded, etc.) that characterizes the determined score.

FIG. 3 is a diagram 300 illustrated a design-time method of generating a scorecard model. Data is received, at 310, that includes a plurality of values for variables across a plurality of transactions. Thereafter, at 320, pairs of variables having a measured interaction level (e.g., divergence residual, RMSE residual, etc.) above at least one pre-defined threshold are identified. These pairs of variables are used, at 330, to generate a scorecard model.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, functional programming language, logical programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and an interface such as a touch screen and/or a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figure(s) and/or described herein do not require the particular order shown, or sequential order, to achieve desirable results. In addition, the current subject matter can be extended to deal with three way or N way interactions as long as there is sufficient computation power and large enough dataset (i.e., N-D scorecard models can also be implemented using the techniques described herein, etc.). Other embodiments may be within the scope of the following claims.

What is claimed is:

1. A computer-implemented method comprising:
   receiving data characterizing a transaction, the data comprising a plurality of values corresponding to variables;
   determining, based on the received data and using a scoring model, a score for the transaction, the scoring model only using variables pairs having a divergence residual above a pre-defined threshold, the divergence residual being a difference between a divergence of an N-dimensional scorecard model and a divergence of an N-variable scorecard for a pair of variables, wherein N is an integer greater than or equal to 2; and
   providing data characterizing the determined score;
   wherein at least one of the receiving, the determining, and the providing is performed by at least one processor of at least one computing system.

2. A method as in claim 1, wherein providing data comprises one or more of:
   displaying the score, transmitting data characterizing the determined score, loading data characterizing the determined score, and storing data characterizing the determined score.

3. A method as in claim 1, wherein the scoring model is a scorecard model.

4. A method as in claim 3, wherein the scoring model is a two dimensional (2-D) scorecard model.

5. A method as in claim 3, wherein the scoring model is an N dimensional scorecard model, wherein N is greater than 2.

6. A method as in claim 3, wherein the scorecard model is developed by capturing interactions among cross binnings between a given predictor pair $(x_{i1}, x_{i2})$.

7. A method as in claim 6, wherein the interactions among cross binnings are captured using:

$$f_{i1,i2}(x_{i1}, x_{i2}) = \sum_{j=1}^{J_{i1i2}} w_{i1i2,j} b_{i1i2,j}(x_{i1}, x_{i2})$$

Where:

$$b_{i1i2,j}(x_{i1}, x_{i2}) = \begin{cases} 1 & \text{if values of } x_{i1} \text{ and } x_{i2} \text{ belong to } j\text{th cross bin} \\ 0 & \text{else} \end{cases},$$

$w_{i1i2j}$: is a weight for cross bin j for predictor pair $(x_{i1}, x_{i2})$,
$b_{i1i2j}$: is an indicator variable for each cross bin of predictor pairs $(x_{i1}, x_{i2})$.

8. A method as in claim 7, wherein the divergence residual, $\text{DivR}(x_{i1}, x_{i2})$, is equal to $\text{Div}(x_{i1} \times x_{i2}) - \text{Div}(x_{i1} + x_{i2})$, wherein $\text{Div}(x_{i1} \times x_{i2})$ is divergence of an N dimensional scorecard model, and $\text{Div}(x_{i1} + x_{i2})$ is divergence of an N-variable scorecard.

9. A method as in claim 1, wherein the scoring model $f$ comprises:

$$f = w_0 + \sum_{i=1}^{I} f_i(x_i) + \sum_{(i1,i2)} f_{i1,i2}(x_{i1}, x_{i2})$$

wherein the $w_0$ is an initial regression weight to be trained;
where $f_i(x_i)$ is a predictor score:

$$f_i(x_i) = \sum_{j=1}^{J_i} w_{ij} b_{ij}(x_i)$$

$$b_{ij}(x_i) = \begin{cases} 1 & \text{if value of } x_i \text{ belongs to the } j\text{th bin} \\ 0 & \text{else} \end{cases}$$

$w_{ij}$: are score weights associated with bin j for predictor $x_i$,
$b_{ij}$: is an indicator of variables for the bins of predictor $x_i$.

10. A computer-implemented method comprising:
receiving data characterizing a transaction, the data comprising a plurality of values corresponding to variables;
determining, based on the received data and using a scoring model, a score for the transaction, the scoring model only using variables pairs having a root mean square error (RMSE) residual above a pre-defined threshold, the RMSE residual being a difference between a RMSE of an N-dimensional scorecard model and a RMSE of an N-variable scorecard for a pair of variables, wherein N is an integer greater than or equal to 2; and
providing data characterizing the determined score;
wherein at least one of the receiving, the determining, and the providing is performed by at least one processor of at least one computing system.

11. A method as in claim 10, wherein providing data comprises one or more of: displaying the score, transmitting data characterizing the determined score, loading data characterizing the determined score, and storing data characterizing the determined score.

12. A method as in claim 10, wherein the scoring model is a two dimensional (2-D) scorecard model.

13. A method as in claim 12, wherein the scorecard model is developed by capturing interactions among cross binnings between a given predictor pair $(x_{i1}, x_{i2})$.

14. A method as in claim 13, wherein the interactions among cross binnings are captured using:

$$f_{i1,i2}(x_{i1}, x_{i2}) = \sum_{j=1}^{J_{i1i2}} w_{i1i2,j} b_{i1i2,j}(x_{i1}, x_{i2})$$

Where:

$$b_{i1i2,j}(x_{i1}, x_{i2}) = \begin{cases} 1 & \text{if values of } x_{i1} \text{ and } x_{i2} \text{ belong to } j\text{th cross bin} \\ 0 & \text{else} \end{cases},$$

$w_{i1i2,j}$: is a weight for cross bin j for predictor pair $(x_{i1}, x_{i2})$,
$b_{i1i2,j}$: is an indicator variable for each cross bin of predictor pairs $(x_{i1}, x_{i2})$.

15. A computer-implemented method comprising:
receiving data comprising a plurality of values for variables across a plurality of transactions;
identifying pairs of variables having divergence values above a pre-defined threshold, the identifying being determined based on a divergence residual being a difference between a divergence of an N-dimensional scorecard model and a divergence of an N-variable scorecard for a pair of variables, wherein N is an integer greater than or equal to 2; and
generating a scorecard model using the identified pairs of variables;
wherein at least one of the receiving, the identifying, and the generating is performed by at least one processor of at least one computing system.

16. A method as in claim 15, wherein the scorecard model is a segmented scorecard model and the identified pairs of variables are used as splitter variables.

17. A computer-implemented method comprising:
receiving data comprising a plurality of values for variables across a plurality of transactions;
identifying pairs of variables having RMSE residual values above a pre-defined threshold, the RMSE residual being a difference between a RMSE of an N-dimensional scorecard model and a RMSE of an N-variable scorecard for a pair of variables, wherein N is an integer greater than or equal to 2; and
generating a scorecard model using the identified pairs of variables;
wherein at least one of the receiving, the identifying, and the generating is performed by at least one processor of at least one computing system.

18. A method as in claim 17, wherein the scorecard model is a segmented scorecard model.

19. A method as in claim 18, wherein the segmented scorecard model is found using a segmented scorecard search procedure.

20. A method as in claim 19, wherein the identified pairs of variables are used as splitter variables.

* * * * *